United States Patent [19]

Heidel et al.

[11] Patent Number: 4,531,300

[45] Date of Patent: Jul. 30, 1985

[54] ELECTRONIC INCLINATION GAUGE WITH ACCELERATION COMPENSATION

[75] Inventors: Jeffrey C. Heidel, Phoenix; Harold L. Swartz, Glendale, both of Ariz.

[73] Assignee: Sperry Corporation, New York, N.Y.

[21] Appl. No.: 607,997

[22] Filed: May 7, 1984

[51] Int. Cl.³ .................................................. G01C 9/06
[52] U.S. Cl. ....................................... 33/366; 33/356; 73/505; 73/510
[58] Field of Search ...................... 33/366, 365, 363 N, 33/356, 125 A, 1 E, 1 H; 73/505, 510, 1 LE, 488, 489, 494, 495

[56] References Cited

U.S. PATENT DOCUMENTS

| | | | |
|---|---|---|---|
| 3,277,840 | 10/1966 | Yao-Tzu Li | 33/365 |
| 3,871,235 | 3/1975 | Anderson | 73/510 |
| 3,984,918 | 10/1976 | Chaney | 33/366 |
| 4,085,375 | 4/1978 | Galuschak et al. | 33/366 |
| 4,246,790 | 1/1981 | Nichols | 73/510 |
| 4,393,709 | 7/1983 | Harumatsu et al. | 73/505 |

FOREIGN PATENT DOCUMENTS

| | | | |
|---|---|---|---|
| 2847128 | 5/1980 | Fed. Rep. of Germany | 33/366 |
| 0131509 | 8/1983 | Japan | 33/366 |

Primary Examiner—Willis Little
Attorney, Agent, or Firm—Howard P. Terry; Arnold L. Albin

[57] ABSTRACT

An apparatus for providing dynamic measurements of the grade of a road bed provides correction for accelerations of the carrying vehicle. A tilt transducer, responsive to both the angle and sense of inclination and to accelerations of the vehicle is used to measure the angle of displacement. The time rate of change of velocity signal derived from the motion of the vehicle is used to provide a signal corresponding to the vehicular acceleration. The acceleration signal level is adjusted to cancel acceleration sensed by the transducer, thereby providing an output reflecting the true angular grade reading.

16 Claims, 8 Drawing Figures

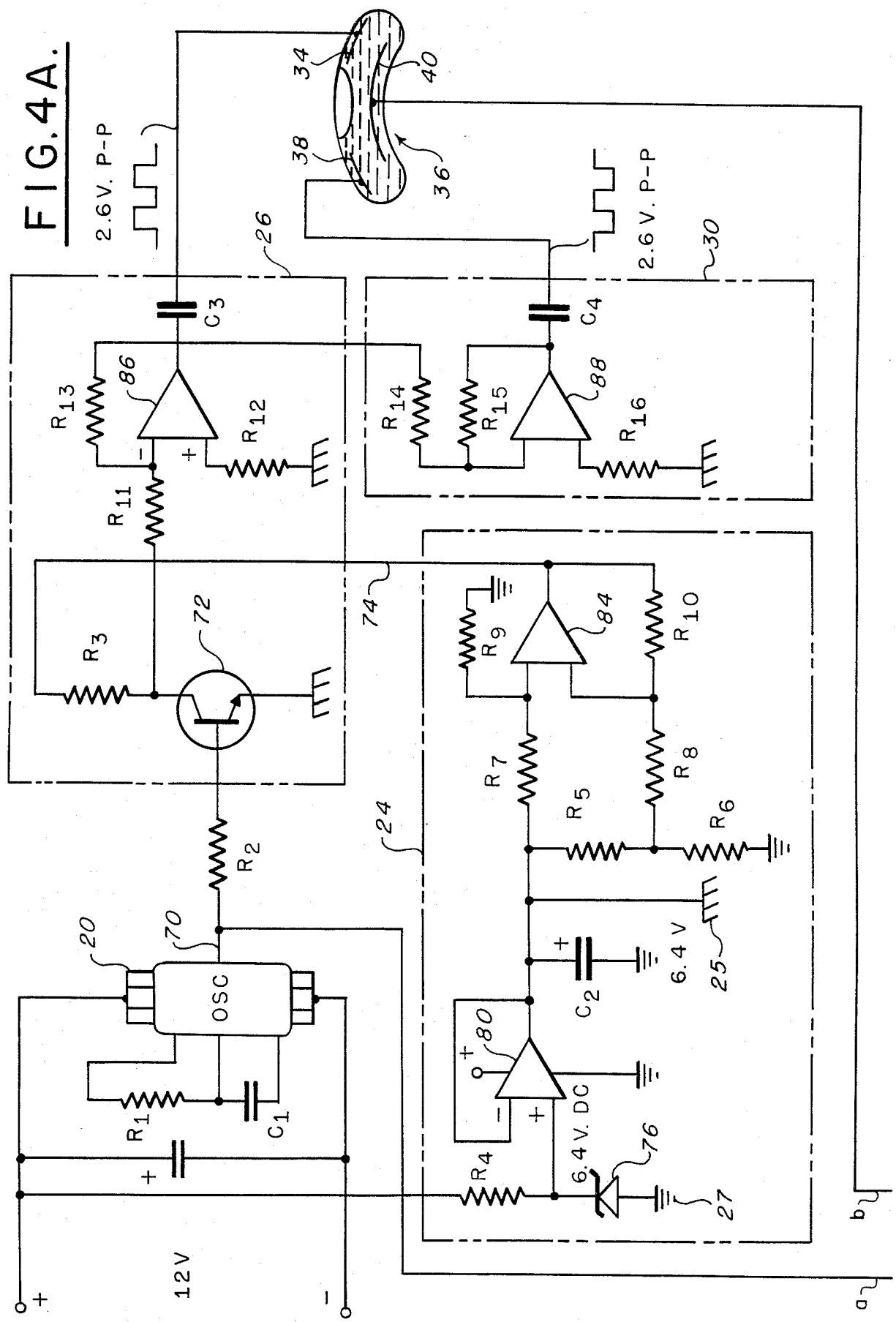

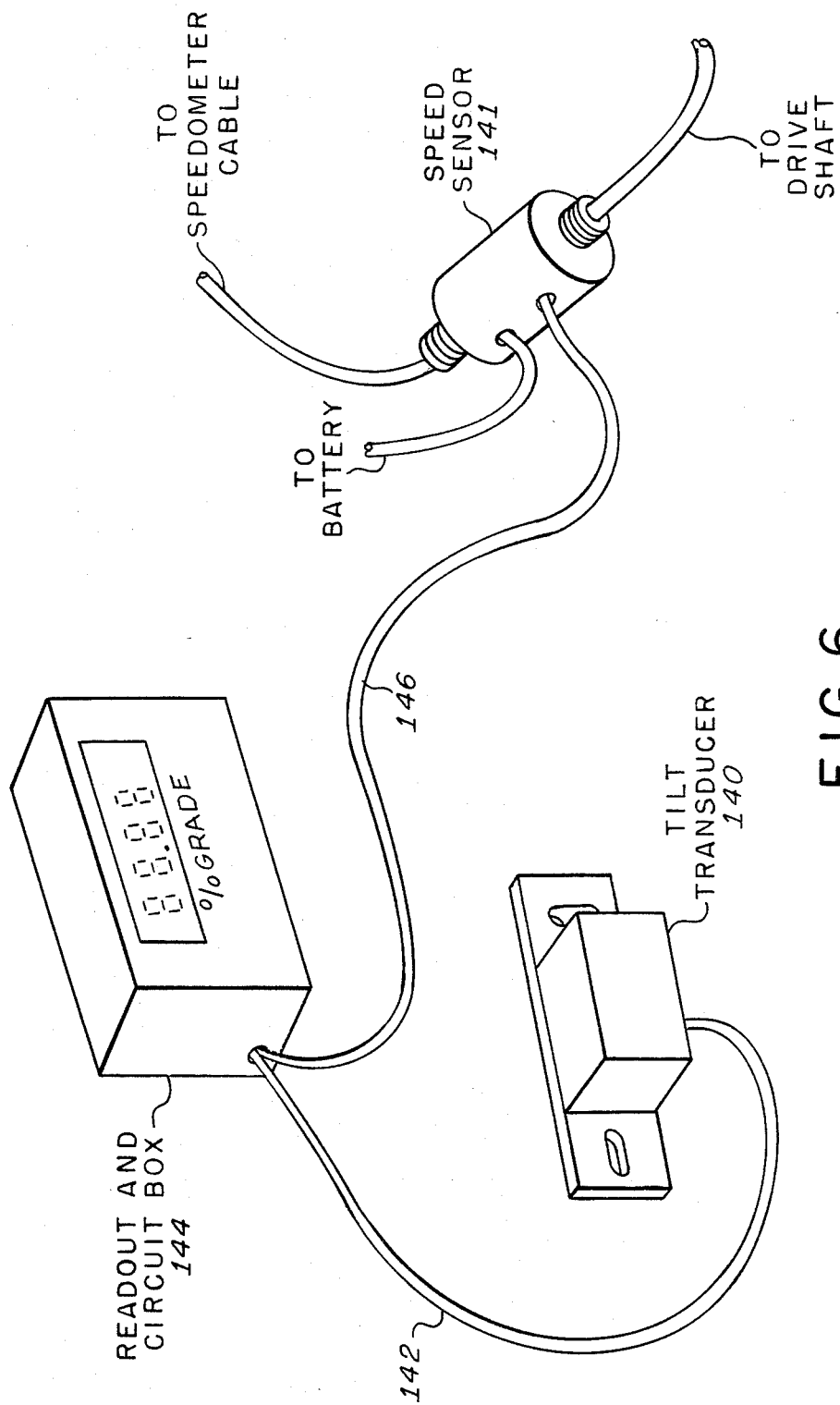

ELECTRONIC INCLINATION GAUGE WITH ACCELERATION COMPENSATION

BACKGROUND OF THE INVENTION

1. Field of the Invention

The invention pertains to the art of electrolytic accelerometers used as tilt sensors and, more particularly, to devices of this type which include means for providing compensation for acceleration errors when used in a moving vehicle.

2. Description of the Prior Art

The invention relates to apparatus for sensing and measuring changes in inclination. Such apparatus has many applications; for example, in one form the apparatus may be used to sense or measure the variations in tilt of a surface from a datum position such as the horizontal. Thus, the invention may be used to measure accurately the grade of a road bed being traversed. Heavily loaded trucks may be unable to negotiate a road beyond a predetermined grade, and hence would find useful a device capable of measuring the grade while in motion and before stopping. Highway departments would find such a device useful for measuring the grades of highway under construction or for surveying roads about to be modernized.

Because a moving vehicle subjects the sensing apparatus to longitudinal accelerations when it accelerates or decelerates in a forward direction, it has been necessary to compensate for the effects of such acceleration in order to obtain an accurate reading of road grade. However, such apparatus used heretofore has been characterized by an inability of the gravity reference sensor to distinguish between actual tilt of the vehicle from a horizontal reference axis and the influence thereon of the horizontal components of acceleration. Because of the frequent accelerations encountered by the vehicle and therefore the sensing equipment, expensive and complex gyroscopic equipment has previously been used for the measurement of instantaneous grades of road beds. This may include a conventional gyroscopic apparatus such as that described by Shigeo Kubo in U.S. Pat. No. 4,219,940, "Angular Accelerometer Stabilized Pendulum", which provided a pendulum capable of maintaining its alignment with the local gravity vector independently of horizontal acceleration. Another accelerometer for use in vertical angle measurements is described by Klas R. Wicklund in U.S. Pat. No. 4,277,895, "Apparatus for Indicating Angular Position in a Vertical Direction" which provided a pendulum driving a coil rotatable in a magnetic field capable of supplying a current output indicative of the degree of rotation of the pendulum with respect to a vertical reference position. However, these devices are complex mechanically, expensive, and lack the robustness required for vehicular service. Another accelerometer of the liquid level type was described by C. G. Buckley, G. A. Bhat and Harold L. Swartz in U.S. Pat. No. 4,028,815, assigned to the assignee of the present invention. While providing a relatively simple and rugged sensor capable of measuring angular displacement, this level is incapable of distinguishing the angular displacement from the longitudinal accelerations.

The present invention provides a gauge for compensating the acceleration sensitive response of a liquid level sensor gravity reference by utilizing an independent sensing of velocity and processing the value obtained to compensate the output of the sensor to yield a measurement of road grade free of acceleration effects. Beneficially, this approach eliminates mechanical gears and linkages and substantially reduces the cost, while providing improved effectiveness and accuracy.

SUMMARY OF THE INVENTION

The present invention obviates the above-discussed disadvantages of the prior art instruments for measuring road bed inclination in a moving vehicle subject to an acceleration by providing a tilt-sensitive transducer having an output corresponding to the acceleration and to the angle and direction of the transducer along a reference axis with respect to a gravitational field. The apparatus includes a velocity sensor coupled to the vehicle to provide an output corresponding to a velocity component of the vehicle along the reference axis, and a circuit for processing the velocity signal to derive a signal corresponding to the component of acceleration along the reference axis. The acceleration signal is algebraically subtracted from the transducer output signal thereby nulling out the acceleration signal component and providing an output which is representative of the inclination of the reference axis with respect to the gravitational field, independent of the acceleration of the vehicle. The corrected output is then coupled to an output indicator for providing a reading indicative of the inclination of the vehicle and the road bed on which it travels.

In a preferred embodiment, the tilt transducer comprises a liquid level potentiometer symmetrically excited by a bipolar signal source, which provides an output whose phase and amplitude corresponds to the inclination of the level with respect to the gravitational field. The bipolar output is then rectified and provides a unidirectional signal of variable amplitude and polarity corresponding to the tilt of the instrument. A speedometer in the vehicle is coupled to a sensor which provides an output signal responsive to the speed of the vehicle, which output signal is then differentiated to provide an acceleration component in the direction of travel. Since the tilt transducer is also sensitive to the acceleration of the vehicle, by subtracting the acceleration component derived from the speedometer from the transducer output signal a resultant output is provided which is independent of vehicular acceleration and depends only on the tilt of the sensor.

BRIEF DESCRIPTION OF THE DRAWINGS

FIG. 4A is a schematic circuit diagram of a transducer excitation circuit as used in the present invention.

FIG. 6 is a conceptual view in perspective showing how the elements of the present invention are packaged for a vehicular installation.

DESCRIPTION OF THE PREFERRED EMBODIMENT

As discussed above, prior art systems utilizing accelerometer sensing elements for measuring the angular displacement of a road bed from the horizontal with the instrumentation mounted in a moving vehicle are subject to acceleration errors when the vehicle speeds up or slows down. These errors are caused by reason of the inability of the accelerometer transducer which is used as a gravity reference to distinguish between actual tilt of the vehicle about an axis displaced from the horizontal and the influence thereof of fore and aft components of acceleration when the vehicle accelerates or decelerates in a forward direction. In accordance with the present invention, the improved system includes means for compensating for the error inducing acceleration components so that the tilt indicating instrument responds to an actual vertical gravitational acceleration rather than to an apparent vertical. The means provided herein for compensating for the acceleration error utilizes the motion of the vehicle to provide a velocity signal which is then processed to derive a longitudinal acceleration component. The acceleration component of the vehicle is algebraically subtracted from the acceleration component of the transducer thereby providing an output proportional only to the angular inclination of the road bed from the horizontal and independent of the vehicular acceleration in the direction of travel.

Figure 1:
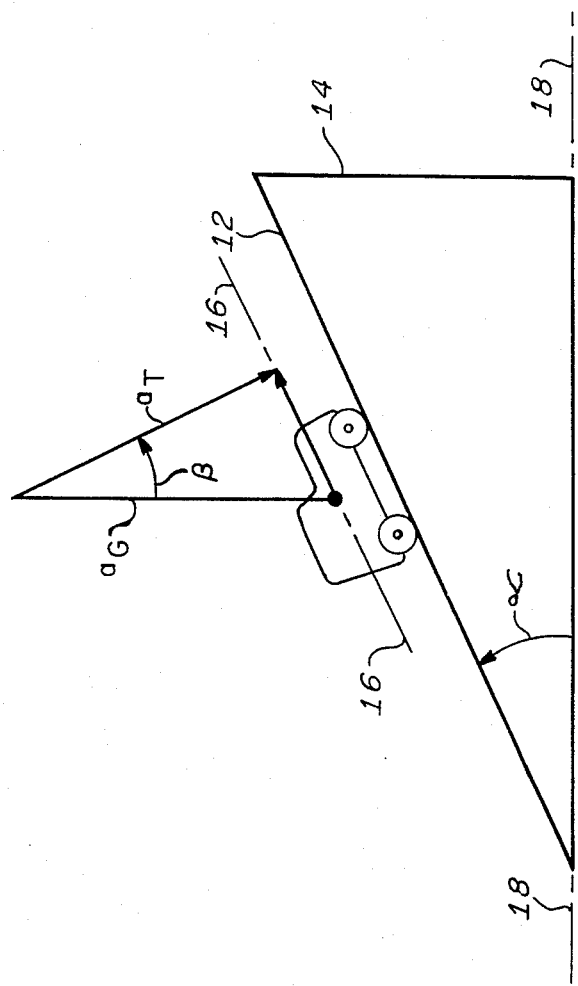
FIG. 1 is a schematic view of a vehicle ascending a grade, showing the error introduced by longitudinal acceleration.

FIG. 1 shows a vehicle 10 traveling along a road bed 12 inclined at a tilt angle $\alpha$ from the horizontal plane 18. It is desired to measure the tilt angle $\alpha$ of the road bed from instrumentation located within the vehicle 10. It may be seen that a gravity reference located within the vehicle will be subject to a total acceleration vector $a_T$ which is the vector sum of the earth's gravitational acceleration vector $a_G$ and the acceleration vector due to the fore and aft speed changes of the vehicle, $a_V$. Since the tilt sensor measures total acceleration due to its inability to distinguish between the actual tilt of the vehicle as referenced to the gravitational vector $a_G$, and the apparent tilt, it will display a pitch angle error by an amount equal to the angle $\beta$. As an example, it may be assumed the vehicle is traveling at 55 mph and reduces its speed to 45 mph over a ten second period. The resultant deceleration is:

$$a = dV/dt = \Delta V/\Delta t \tag{1}$$

where dV/dt represents the derivative of velocity; and $\Delta V/\Delta t$ represents the resultant acceleration when measured over a suitably short interval.

Figure 2:
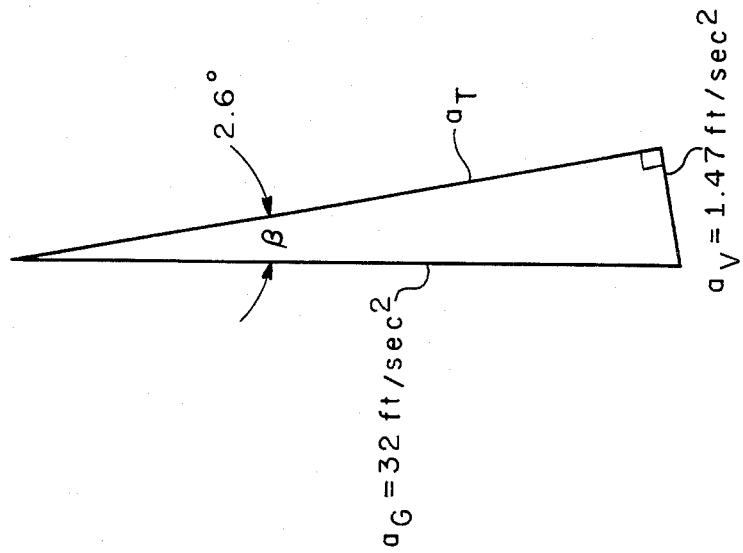
FIG. 2 shows how the algebraic combination of the acceleration component due to gravity and the longitudinal component due to vehicular motion produces a resultant tilt error.

Substituting the values provided above for the present example, one obtains:

$$a = \frac{(10 \text{ mph}) \frac{88 \text{ ft/sec}}{60 \text{ mph}}}{10 \text{ sec}} = 1.47 \text{ ft/sec}^2 \tag{2}$$

and $$\beta = \tan^{-1} \frac{1.47}{32.2} = 2.6° \tag{3}$$

and the vehicle is seen to be decelerating at a rate of 1.47 ft/sec². Referring now to FIG. 2, which is not drawn to scale and has been exaggerated for clarity, the indicated error angle $\beta$ is found from the angle whose tangent is defined as in equation (3) where 1.47 represents the forward deceleration of the vehicle and 32.2 represents the vertical acceleration vector of the earth's gravitational field. The resultant value of 2.6° is equal to an error of approximately 4.6% of grade. Typically, the measuring apparatus would be capable of measuring a change of 10% grade, and the road beds would not exceed 6% grade. Thus, an error of almost 5% of grade has developed simply through a gradual slowing of the vehicle.

Clearly, the output of the gravity reference sensor is influenced by the accelerations thereon to a significant effect. The present invention provides for sensing the longitudinal component of acceleration and compensating for its effect so as to indicate the true grade of the road bed. This is accomplished by providing a tilt transducer comprised of a liquid level of the bubble type including a containing vial, electrodes, and a conductive fluid. The vial is preferably mounted within a housing which is aligned along a reference axis with respect to the gravitational field. The vial is excited by an a.c. source and contains an electrolyte providing a variable impedance with respect to exciting contacts disposed at opposing ends of the vial and a centrally disposed common contact. The transducer thereby acts as a potentiometer when excited by a balanced voltage source, to provide an output responsive in magnitude and phase to the direction and extent of inclination of the transducer, thereby providing an indication of the inclination of the reference axis with respect to the gravitational field. However, the output of the device is subject to the acceleration error previously described and must be corrected therefor. In order to condition the transducer output to a form suitable for correction, the a.c. output is rectified in a suitable demodulator providing a bipolar pulse output and integrated to provide a unidirectional or d.c. output with polarity that is variable in accordance with the inclination of the transducer. Acceleration correction is provided by a velocity signal which may be derived by coupling to a conventional speedometer on the vehicle, and processing the resultant velocity signal through a differentiating circuit, thereby providing an output voltage proportional to the acceleration of the vehicle. This output, suitably scaled in d.c. form, may be subtracted from the integrated transducer output, thereby providing a resultant output indicative of the inclination of the reference axis and independent of the acceleration of the vehicle.

Figure 3:
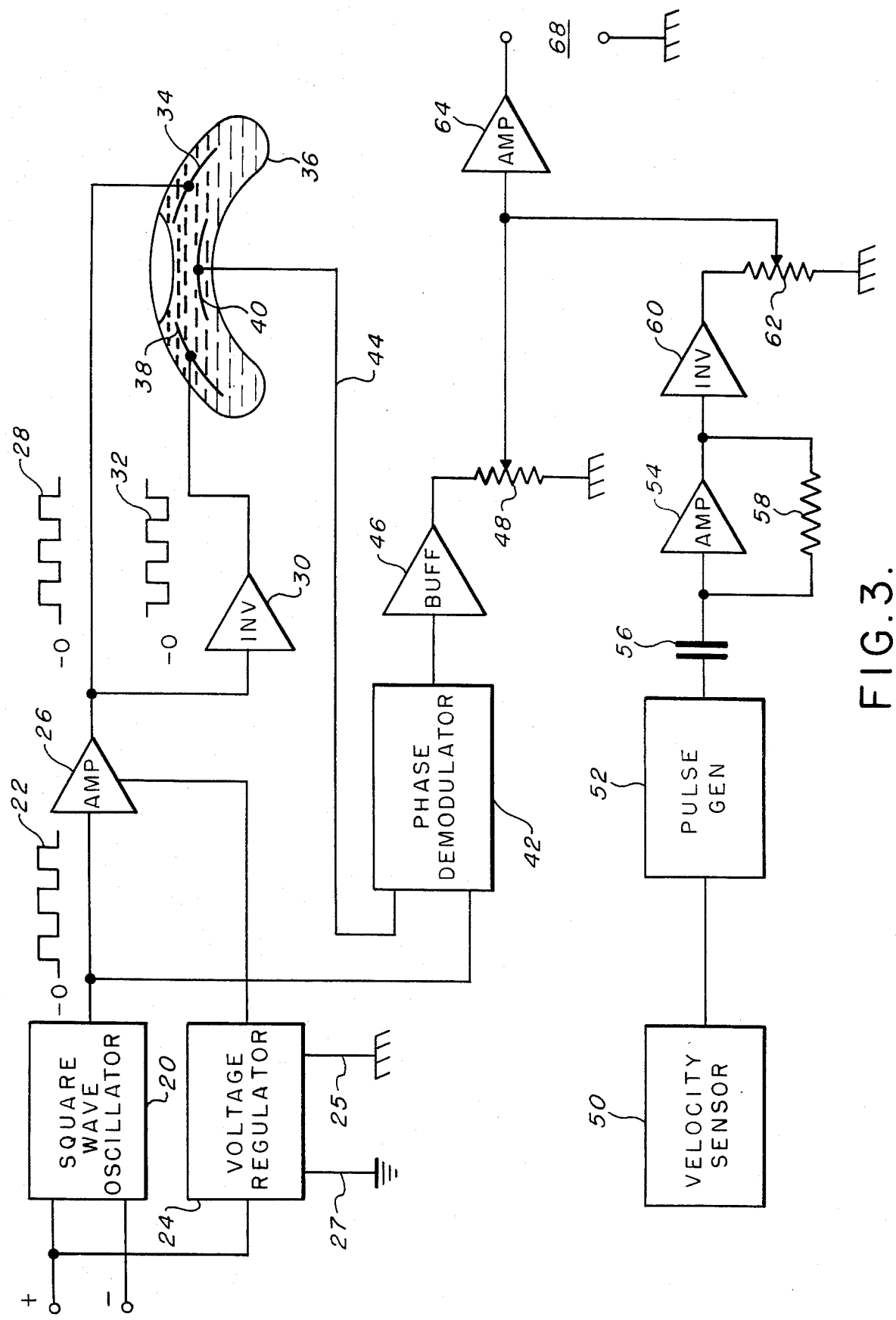
FIG. 3 is a schematic block diagram showing the system of the present invention.

Referring now to FIG. 3, there is shown in schematic form a block diagram of the present invention. A conventional astable multivibrator 20 is used to generate a square wave pulse train 22. The period of oscillation is primarily determined by the time constants of associated components, as is described below. The pulse output 22 is used to drive an amplifier 26 which is biased by a voltage regulator 24 to energize a signal bus 25 which is at a positive potential with respect to a power supply return 27. Since both the signal ground and a d.c. supply reference voltage developed by regulator 24 on line 29 are essentially independent of battery supply voltage, the resultant output 28 of amplifier 26 is a highly stable square wave which is substantially independent of supply voltage variations.

The pulse output 28 of amplifier 26 is applied to an end electrode 34 of conventional liquid level sensor 36. The signal 28 is also applied to an inverter 30 which supplies a signal 32, 180° out-of-phase with signal 28, to electrode 38 which is disposed at the opposing end of sensor 36. The sensor output is provided from central electrode 40 and coupled to a phase demodulator 42.

The invention is not limited to the use of electrolytic sensors, and any other type of deflection sensor of the potentiometric type is also suitable. For example, the magnetically coupled pendulous accelerometer described in said U.S. Pat. No. 4,277,895 would be suitable. Other potentiometric sensors with resistive elements, whose resistances varies in magnitude and sense according to the extend and direction of tilt, may also be used.

Since the a.c. source 26 is arranged to provide to sensor 36 two out-of-phase a.c. voltages of equal amplitude with respect to the common signal bus 25, the signal supplied by electrode 40 is dependent in amplitude and phase on the degree and direction of tilt of the sensor 36. The output 22 of oscillator 20 and the sensor output on line 44 are fed to the phase demodulator 42. The demodulator is phase synchronized to signal 22 from oscillator 20 and detects the amplitude of the sensor output from electrode 40 to provide a d.c. voltage, the magnitude of which is proportional to the angle of inclination from the reference and the sense (positive or negative) of which is dependent on the direction of inclination of the sensor 36.

The output voltage of demodulator 42 is coupled to a buffer amplifier 46 and then to a potentiometer 48 for calibrating the sensor 36 to a known angular standard inclination. Amplifier 64 is used to couple the output of potentiometer 48 and an acceleration correction signal, in a manner to be described.

A velocity sensor 50 is provided and may be mounted in a housing in the vehicle. The sensor is coupled to a speedometer or other element linked to the drive train of the vehicle and thus provides an output proportional to the speed of the vehicle to pulse generator 52. A suitable velocity sensor may be constructed by coupling a shutter to the speedometer shaft and using the shutter to interrupt a source of light impinging on a phototransistor. Thus, as the shutter operates to interrupt the light rays from the light source, the output of the phototransistor appears as a corresponding sequence of pulses. Pulse generator 52 is adapted to provide a square wave output of fixed pulse duration and pulse width, whose output frequency corresponds to the input frequency from velocity sensor 50. The output of pulse generator 52 is filtered, applied to amplifier 54, and then to capacitor 56. Capacitor 56 and resistor 58 in combination with amplifier 54 form a simple differentiator circuit which accepts the velocity input from pulse generator 52 and by differentiation provides a voltage proportional to the rate of change of speed or acceleration to inverter 60 as in equation (1). Additional circuitry, shown in FIG. 4C to be described, mateches the transient response of inverter 60 to the corresponding time constant of sensor 36. Thus, when sensor 36 is offset from a preset reference level, thereby providing a d.c. output to amplifier 64, a corresponding acceleration output from inverter 60 is adjusted by means of potentiometer 62 and mixed with the detected sensor output from potentiometer 48 so that it will exactly cancel the acceleration forces sensed by electrolytic sensor 36, thus cancelling any acceleration outputs from sensor 36 and providing d.c. output at terminal 68 that reflects only the angular grade reading, independent of acceleration of the vehicle.

Any suitable d.c. indicator may be used as an output device when calibrated to present a grade reading. For example, this could be a digital voltmeter or an analog voltmeter, scaled to provide a useful range of angle readings, such as 0 to 10 degrees, plus or minus.

Referring now to FIG. 4A, which shows the detailed circuitry for applying excitation pulses to the sensor 36, the square wave oscillator 20 is supplied power from a single d.c. source which may be a twelve-volt vehicular battery. Oscillator 20 is comprised of an astable multivibrator such as a digital integrated circuit, type CD 4047. The period of the square wave produced at the output 70 is a function of the external components $R_1$ and $C_1$. This circuit provides a 50% duty cycle with good frequency stability operable over a wide temperature range. A frequency of 500 $H_Z$ is suitable for this application but other frequencies may also be chosen. The circuit shown provides essentially a twelve volt peak output with respect to d.c. ground to the base of transistor amplifier 72, which drives amplifier circuit 26. Amplifier 72 may be a conventional transistor type amplifier such as type 2N2432. Amplifier 72 is coupled to oscillator 70 by resistor $R_2$ and biased from a precision voltage regulator 24 through resistor $R_3$.

Voltage regulator 24 is comprised of a reference zener diode 76 which is preferably temperature compensated and here selected to provide an output of 6.4 volts d.c. Resistor $R_4$ couples diode 76 to the 12 volt power supply. The d.c. return of diode 76 is applied to a bus 27 which constitutes the d.c. return or power ground. A voltage follower 80, which may be comprised of a conventional integrated circuit operational amplifier, such as type LM148, provides a low impedance 6.4 volt output which is applied to signal ground bus 25. This creates a signal ground approximately midway between the 0 volt and +12 volt potentials of the input power supply source and permits driving the circuitry associated with the system by plus and minus voltages referenced to the signal ground bus 25. Capacitor $C_2$ filters this supply in a conventional manner. The voltage regulator circuit 24 thus provides positive and negative supply voltages with respect to signal ground from a single 12-volt power supply.

The +6.4 volt output from amplifier 80 is applied through voltage divider $R_5$, $R_6$ in combination with series connected resistor $R_8$ to a negative (−) input of operational amplifier 84. This d.c. level is also coupled through voltage divider $R_7$, $R_9$ to the positive (+) differential input. Resistor $R_{10}$ controls the gain of amplifier 84. Amplifier 84 has a gain adjusted to provide about +9 volts with respect to power ground 27, on line 74, which thereby provides a voltage reference of approximately 2.6 volts with respect to the signal ground 25. Since both the potential applied to signal ground 25 and the voltage reference term on 74 are derived from the regulated 6.4 volt source 80, the difference voltage which is applied to amplifier 72 is now essentially independent of variations in the +12 volt d.c. battery source. This of of particular significance in an automative vehicle wherein battery voltage may vary within relatively wide limits depending on the ambient temperature and engine speed conditions. Amplifier 84 may be a conventional operational amplifier, such as type LM11.

Amplifier circuit 26 is further comprised of a second stage operational amplifier 86, with one input driven by amplifier 72 through series resistor $R_1$, and a second input connected to ground through resistor $R_{12}$, in a conventional manner. Resistor $R_{13}$ is adjusted to provide a suitable gain factor so that the output of amplifier 86 appears as a square wave pulse of approximately 2.6 volts peak-to-peak across capacitor $C_3$ from where it is coupled to electrode 34 of transducer 36. The output of amplifier 86 is also coupled to inverter 88 through resistor 14 and is biased by resistors $R_{15}$ and $R_{16}$ to provide an output voltage across capacitor $C_4$ which is equal to amplitude but 180° degrees out of phase with the voltage across capacitor $C_3$. Capacitor $C_4$ is coupled to electrode 38. Thus, electrodes 34 and 38 are biased by square wave signals of equal voltage but opposing polarity.

Figure 4B:
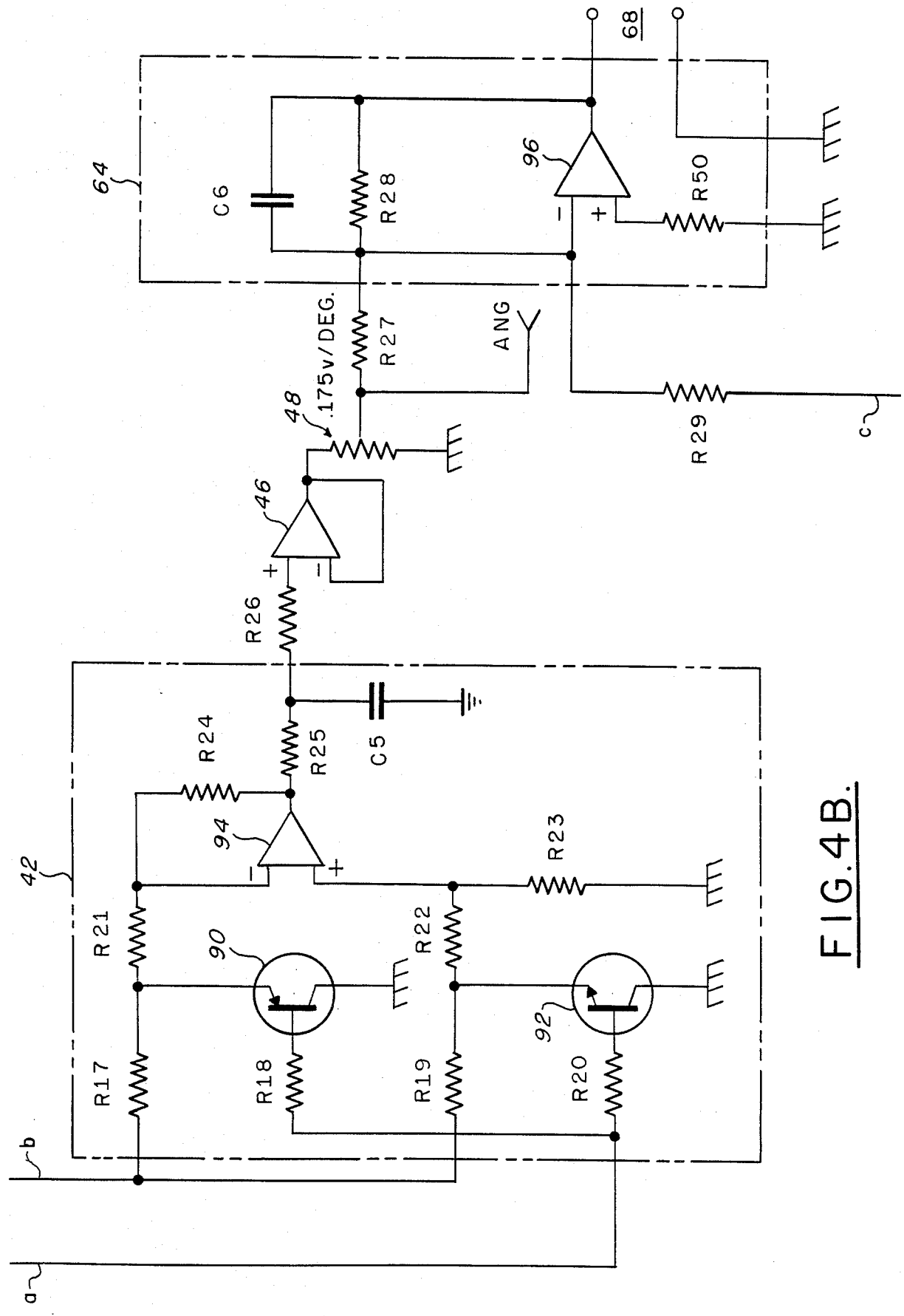
FIG. 4B is a schematic circuit diagram of a demodulation circuit as used in the present invention.

Referring now to FIG. 4B, with continued reference to 4A, it may be seen that the signal outputs from reference oscillator 20 and sensor 36 on lines a and b, respectively, are coupled to demodulator circuit 42. Transistors 90 and 92, which may be type 2N2945 and 2N2432, respectively, are bipolar transistors of the p-n-p and n-p-n type, respectively. The transistors are connected in a grounded collector configuration, and operate in a saturated switching mode. The square wave reference line a from oscillator 20 is coupled through resistors R18 and R20, respectively, to the base of an associated transistor 90,92. Similarly, the signal output from the transducer 36 is coupled through resistor R17 to the emitter of transistor 90, and through resistor R19 to the emitter of transistor 92. Resistor R21 and resistor R22 couple emitters of transistor 90 and transistor 92, respectively to the dual inputs of a differential amplifier 94. A feedback resistor R24 coupled across amplifier 94 determines the amplifier gain.

The output of amplifier 94 is applied to filter R25, C5, R26. The output waveform of amplifier 94 is a pulse train of negative or positive polarity with respect to reference a, corresponding to the sense of the angle of inclination of transducer 36, and an amplitude corresponding to the deviation of the transducer from the reference axis. The pulse train is filtered by R25, C5, R26 and the d.c. voltage derived therefrom applied to current driver 46. The output of driver 46 represents a current or voltage corresponding to the direction and magnitude of the inclination of transducer 36 from the reference axis. This signal is then applied to potentiometer 48 to permit calibration against a standard of angular deviation. In one embodiment, the calibration was established at 0.175 V/DEG, corresponding to 0.1 V/% Grade. The output of potentiometer 48 is coupled through resistor 27 to the input of operational amplifier 96 whose function is to combine the signal component representing angular displacement within an acceleration component whose derivation is described below. A feedback network C6, R28 is applied to amplifier 96 so as to control the gain and transient response to be compatible with the response of sensor 36.

Figure 4C:
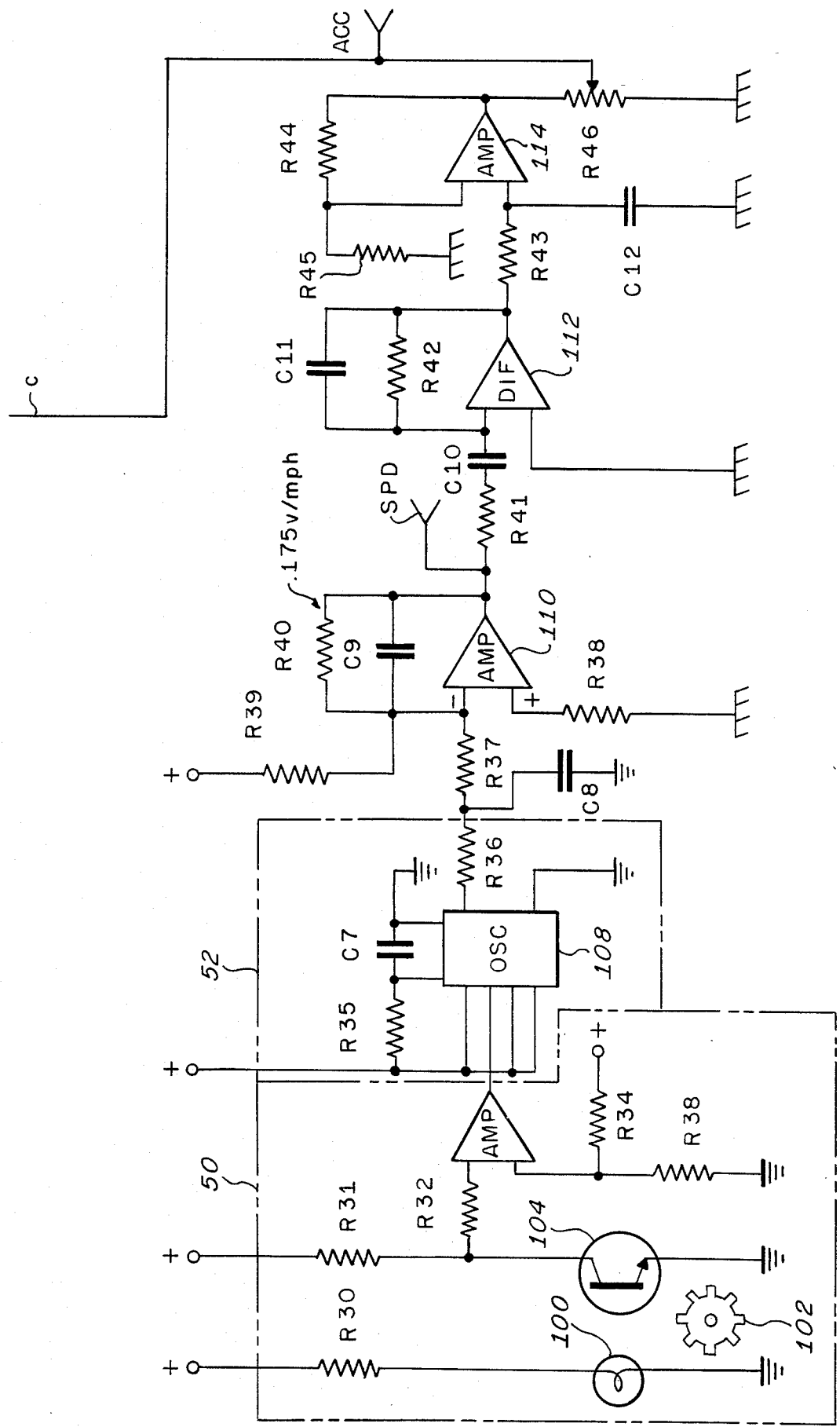
FIG. 4C is a schematic diagram of a velocity sensor and integrator as used in the present invention.

The circuit of FIG. 4C comprises the elements necessary to derive an acceleration voltage correction component. Circuit 50 comprises a velocity sensor for deriving a voltage proportional to the speed of the vehicle. A light source 100, which may be an LED, is coupled through limiting resistor R 30 to a suitable source of power. A light sensitive device such as a phototransistor 104 is mounted in proximity to the light source 100. Interposed between the light source and the phototransistor is a shutter 102 which may be comprised of a circular plate having radially extending fins therefrom, for interrupting the light path. Shutter 102 is coupled to a drive shaft of the vehicle or the speedometer cable. As the vehicle moves, the shutter is correspondingly caused to rotate, thereby interrupting the light source periodically at a frequency proportional to the speed of the vehicle. Other suitable sensors such as a magnetically responsive pickup operating in cooperation with a rotating magnetic member are also suitable, and are well known in the art. Photodiode 104 is biased through resistor R31 from the vehicle power source so as to produce an output current when energized by light source 100. The output is applied to resistor R32 and coupled to amplifier 106 to provide a signal of variable pulsewidth and pulse repetition rate, responsive to the speed of the vehicle. Operational amplifier 106 is biased by resistors R33, R34 to provide an output pulse train to oscillator circuit 52 with an average value of approximately 1 V/DC that is never driven negative. Oscillator 108 is a monostable multivibrator which outputs a pulse of predetermined duration and amplitude and a repetition rate proportional to the velocity of the vehicle. Resistor R35 and capacitor C7 determine the pulsewidth and duration in a conventional manner. The output of oscillator 108 is filtered by network R36, R37, C8 and coupled to amplifier 110. Network R40, C9 determines the gain and transient response of amplifier 110 and provides additional filtering. Thus, the output of amplifier 110 is an analog voltage proportional to the speed of the vehicle. In the embodiment shown herein the circuit constants were chosen to provide approximately 0.175 V/MPH. The analog speed output is coupled through series connected resistor R41 and capacitor C10 to operational amplifier 112. Series capacitor C 10 and shunt resistor R42 in combination with amplifier 112 provide a differentiating function so that the input to resistor R43 represents a voltage proportional to the rate of change of speed, or acceleration. Amplifier 114, whose gain is controlled by resistors R44 and R45, inverts the signal applied from resistor R43. Capacitor C12 is used to adjust the time contant of response of amplifier 114 so that it matches the transient response of transducer 36. The purpose of this correction is to avoid under-correction or over-correction of the resultant acceleration voltage applied to the buffer amplifier 96. The output voltage from inverter 114 is applied to potentiometer R46. R46 is adjusted to calibrate the acceleration voltage applied to amplifier 96 on line c. The acceleration correction voltage is suitably polarized so that when combined with the angular voltage component at amplifier 96 it will provide a resultant voltage indicative of the sense and angular deviation of transducer 36 from a reference axis aligned with the vehicle. This output will be independent of the vehicular acceleration along the line of measurement.

Figure 5:
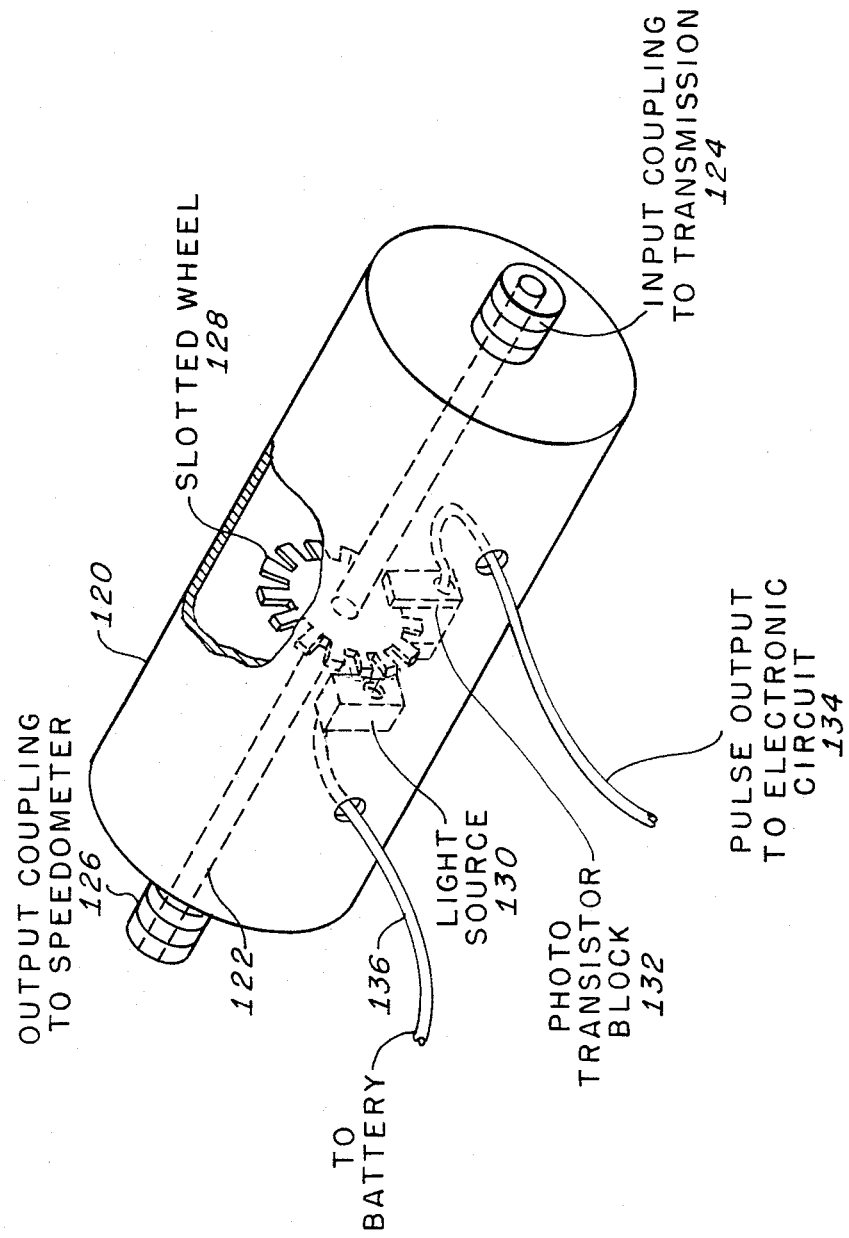
FIG. 5 is a perspective view of a speedometer sensor for providing a velocity output signal.

FIG. 5 shows a conceptual mechanical implementation of velocity sensor 50. A cylindrical housing 120 has a shaft 122 concentrically mounted therein on suitable support bearings, not shown. A first end 124 of the shaft is coupled to a transmission member which drives a speedometer cable. An output coupling 126 may be used to drive the speedometer when the sensor 50 is interposed between the existing speedometer and speedometer cable. Mounted on shaft 122 is a wheel 128 having a plurality of regular pheripheral slots 129. Mounted within the housing and illuminating the slotted wheel is a light source 130 powered by the vehicular battery through cable 136. Also mounted within the housing and aligned with the light source 130 and slotted wheel 128 is a block 132 having mounted thereon a phototransistor. When shaft 122 is driven by the action of the moving vehicle, wheel 128 will periodically interrupt a beam of light from light source 130, thereby energizing phototransistor block 132 in a periodic manner. The resultant pulse output is provided to the external electronic circuit of FIG. 4C on cable 134 for processing and readout.

A suitable system configuration is shown in FIG. 6. The speed sensor 141 is provided with a mechanical input from the drive shaft and in turn may be coupled to provide an output to drive the speedometer cable. Power for the system is furnished by the vehicular battery, although a dedicated supply is also suitable. A tilt transducer 140 is comprised of a suitable housing which may be mounted and aligned with the vehicle frame with respect to a predetermined reference axis. Transducer 140 has contained therein a suitable tilt transducer such as sensor 36, as shown in FIG. 4A. The sensor output signals are conveyed on a cable 142 to the enclosure 144, which contains the electronic circuitry of FIGS. 4A, 4B, and 4C, except for the circuitry associated with sensor 141. Velocity signals from speed sensor 141 are coupled to enclosure 144 by means of cable 146. Enclosure 144 also contains a suitable readout for providing a visual indication of the measured grade.

In operation, the tilt transducer 36, which is responsive both to angular inclination and acceleration, is coupled to a source of pulses 26 and a source of phase inverted pulses 30 derived from a stabilized source of reference voltage 20. When inclined with respect to a reference axis, a differential voltage is developed across electrodes 34–40 and 38–40 of the transducer, due to the unequal areas of the electrodes in contact with the electrolyte, and an output signal at electrode 40 is derived from the transducer which represents by its polarity and amplitude the angle and direction of inclination of the transducer with respect to the reference axis. The resultant output is also responsive to a longitudinal acceleration of the vehicle. A phase demodulator 42 receives the output signal from the transducer and a reference signal 22 from the pulse source 20, which is rectified to provide a bipolar signal whose amplitude and phase are porportional to the angle and direction of inclination of the transducer. A sensor 141 mounted in a vehicle is coupled to a drive shaft or speedometer cable so as to provide a pulse signal output to amplifier 54 representative of the longitudinal velocity of the vehicle in which the apparatus is mounted. The velocity signal is differentiated at amplifier 54 to provide a signal representative of the longitudinal acceleration of the vehicle. The demodulated signal from the transducer 36 and the acceleration signal from amplifier 54 are algebraically combined after sutable buffering so as to cancel the acceleration component in the transducer signal output. The resultant output at terminal 68 is indicative of the inclination of the reference axis of the vehicle with respect to the gravitational field and free from any error induced by accelerations of the vehicle. Absolute readings may be obtained by suitable calibration of the acceleration and angular displacement components.

While the invention has been described in its preferred embodiments it is to be understood that the words which have been used are words of description rather than limitation and that changes may be made within the purview of the appended claims without departing from the true scope and spirit of the invention in its broader aspects.

We claim:

1. Electronic inclination gauge for use in a moving vehicle subject to an acceleration, comprising:
   a tilt sensitive transducer for providing an output corresponding to said acceleration and to the angle and direction of said transducer along a reference axis with respect to a gravitational field,
   a velocity sensor driven by said vehicle for providing an output signal corresponding to a velocity component of said vehicle along said reference axis,
   means coupled to receive said velocity output for deriving a signal representative of a component of said acceleration along said reference axis,
   means for algebraically combining said acceleration signal component and said transducer output to provide a signal representative of the inclination of said reference axis with respect to said gravitational field, independent of said component of acceleration, and
   means responsive to said combined signal to provide an output indicative of said inclination.

2. The gauge as set forth in claim 1, further comprising:
   a housing, longitudinally aligned with said reference axis, whose inclination with respect to said gravitational field is to be measured while said housing is subject to said acceleration,
   said transducer comprising a gravity sensing potentiometer mounted on said housing,
   circuit means for applying a balanced excitation voltage to said potentiometer, and
   means coupled to said potentiometer for deriving said transducer output therefrom, said output having a magnitude and polarity depending on the inclination of said reference axis with respect to said gravitational field.

3. The gauge as set forth in claim 1, wherein:
   said velocity sensor comprises means for sensing the velocity of said housing for providing said output signal corresponding to the velocity component of said housing along said reference axis, and
   said means for deriving said signal component of acceleration comprises circuit means for differentiating said velocity signal.

4. The gauge as set forth in claim 3, in which said velocity sensor further comprises:
   an optical light source for producing a beam of radiation,
   light transmissive means for receiving said radiation and providing at least a portion of said radiation, including means for interrupting said beam to provide a cyclical frequency signal corresponding to said velocity component of said housing,
   sensing means coupled to said light transmissive means responsive to said cyclical frequency signal for generating a pulsed electrical signal whose frequency corresponds to said cyclical frequency, and
   filter means, responsive to said sensing means, to provide a unidirectional current proportional to the repetition rate of said pulsed electrical signal.

5. The gauge as set forth in claim 4 in which said velocity sensor further comprises:
   monostable multivibrator means for generating said pulsed electrical signal, said multivibrator means providing an essentially constant pulse width and an essentially constant peak amplitude.

6. The gauge as set forth in claim 5, wherein said filter means comprises circuit means for summing a plurality of pulses from said pulsed electrical signal and said unidirectional current component is proportional to the average value of said sum.

7. The gauge as set forth in claim 4, in which said circuit means for differentiating said velocity signal further comprises:
   means coupled to receive said unidirectional current, and
   circuit means coupled to said receiving means responsive to the time rate of change of said current.

8. The gauge as set forth in claim 2, said gravity sensing potentiometer comprising:
   an arcuate vial having walls defining a chamber elongated in the direction of a longitudinal axis of the vial,
   said vial being mounted so that said longitudinal axis and said reference axis lie in common plane,
   a liquid defining a bubble being confined within said chamber so that said bubble is free to move in the direction of said longitudinal axis within said chamber according to the inclination of said longitudinal axis with respect to said gravitational field,
   said chamber being convex upwardly with respect to said gravitational field, so that when said longitudinal axis is perpendicular to said gravitational field, said bubble will be in a zero inclination positon within said chamber,
   said liquid comprised of electrolytic means,
   said vial defining first and second ends and a center portion thereof,
   said ends and said center portion further defining contact means comprising corresponding first and second electrode segments, respectively, and an arcuate central electrode communicating with said liquid,
   said contact means so disposed that said central electrode is always in engagement with said liquid, and said first and second electrodes engage at least a portion of said liquid, so that said first and second electrodes provide equal resistance with respect to said center electrode when said vial is at zero inclination with respect to said gravitational field, and unequal resistances when said vial in inclined with respect to said field, the distribution of liquid between the immersed electrodes depending on inclination.

9. The gauge as set forth in claim 2, in which said circuit means for applying balanced excitation to said potentiometer further comprises:
   a stabilized source of reference voltage,
   means for deriving a source of pulses from said reference voltage,
   means coupled to said source for phase inversion of at least a portion of said pulses,
   means for respectively coupling said source of pulses and said phase inverted pulses to respective ones of said first and second electrode segments, and
   means for coupling said signal from said central electrode and said source of pulses to said means for deriving said transducer output; thereby providing a bi-polar signal whose amplitude and phase are proportional to the angle and direction of inclination of said vial.

10. The gauge as set forth in claim 9, in which said circuit means further comprises means for demodulating said bipolar signal, responsive to said source of pulses, to provide a unidirectional signal of variable amplitude and polarity.

11. An instrument for continuously indicating the instantaneous grade of a roadbed during operation thereupon of a motor vehicle equipped with a speedometer, comprising:
   means coupled to said speedometer for deriving a signal proportional to the speed of said vehicle, said means including an optical light source, a shutter coupled to a drive element of said speedometer for interrupting said light source, an optical sensor coupled to said shutter and responsive to said interrupted light source, said sensor providing a pulsed signal corresponding to the speed of said vehicle, circuit means for receiving said pulsed signal and providing a plurality of unipolar pulses of predetermined pulsewidth and duration, circuit means for integrating said plurality of unipolar pulses to provide a direct current signal whose amplitude is proportional to said speed, circuit means for differentiating said direct current signal with respect to time, thereby to provide a velocity signal representing the rate of change of said speed with respect to time, and first potentiometer means coupled to said velocity signal, for scaling said signal;
   circuit means for providing a bipolar excitation signal, including a stabilized source of reference voltage, said source including active voltage divider means adapted to provide balanced positive and negative voltages with respect to a common ground potential, means for deriving a source of bipolar pulses from said reference voltage, including pulse oscillator means coupled to said source, for providing a plurality of pulses of predetermined amplitude, polarity, and duty cycle, and means for deriving a phase inverted pulse of said predetermined amplitude and duty cycle, but of opposing polarity, from said plurality of pulses;
   bubble level potentiometer means, coupled to receive said bipolar excitation signal, and having a tilt axis aligned with a longitudinal axis of said vehicle, for providing an output signal whose phase and amplitude is indicative of the inclination of said tilt axis with respect to a gravitational field, said level means providing a null output signal when said axis is aligned in a plane perpendicular to said gravitational field;
   synchronous demodulation means coupled to receive said output signal and a reference signal from said pulse oscillator means, said demodulation means biased by said reference signal and including phase sensitive rectifier means, adapted to provide a unidirectional signal of variable amplitude and polarity responsive to said output signal;
   second potentiometer means for scaling said unidirectional signal, coupled to receive said scaled velocity signal; and
   means for driving an indicator responsive to the algebraic sum of said scaled unidirectional signal and said scaled velocity signal, thereby to provide an output indicative of the inclination of said longitudinal axis of said vehicle with respect to said gravitational field, free from errors induced by accelerations of said vehicle.

12. A circuit for providing a regulated bipolar voltage output from a unipolar power source and for providing an output voltage across first and second terminals, comprising:
   a ground bus coupled to one of said first or second terminals, means for deriving a regulated reference voltage from said power source, said voltage comprising at least a portion of said output voltage, said means coupled to one other than said one of said first and second terminals and to said ground bus, voltage follower means coupled to receive said reference voltage and to said ground bus, thereby to provide a regulated output voltage with respect to said ground bus representative of said portion of said output voltage, and means for coupling said regulated output voltage to a signal bus, thereby providing a predetermined regulated potential difference between said ground bus and said signal bus.

13. A circuit as set forth in claim 12, further comprising amplifier means responsive to said predetermined potential and coupled to provide a further regulated output voltage with respect to said power ground, said further voltage having a predetermined potential difference with respect to said signal ground and said power ground.

14. A circuit as set forth in claim 13, wherein said potential between said ground bus and said signal bus is at least a portion of said further regulated output voltage.

15. A circuit as set forth in claim 14, wherein said signal ground potential is substantially midway between said further output voltage and said power ground.

16. A method for compensating an acceleration sensitive inclination gauge mounted in a moving vehicle, comprising:

providing a tilt-sensitive accelerometer, having an output responsive to the acceleration and inclination of said vehicle with respect to a gravitational field, providing a velocity sensor coupled to said vehicle for deriving an output corresponding to an acceleration component of said vehicle along a tilt axis with respect to said gravitational field, algebraically combining said outputs to provide a signal representative of the inclination of said vehicle with respect to said gravitational field, and providing an output indicative of said inclination.

* * * * *